United States Patent
Charron et al.

(10) Patent No.: US 8,788,643 B2
(45) Date of Patent: Jul. 22, 2014

(54) SITE INTEGRATION MANAGEMENT SYSTEM FOR OPERATIONAL SUPPORT SERVICE IN AN INTERNET DATA CENTER

(75) Inventors: Frederic Charron, Villeneuve Loubet (FR); Stephanie Modica, Roquefort les Pins (FR)

(73) Assignee: International Business Machines Corporation, Armonk, NY (US)

( * ) Notice: Subject to any disclaimer, the term of this patent is extended or adjusted under 35 U.S.C. 154(b) by 1450 days.

(21) Appl. No.: 12/022,238

(22) Filed: Jan. 30, 2008

(65) Prior Publication Data

US 2008/0172484 A1    Jul. 17, 2008

Related U.S. Application Data

(60) Continuation of application No. 11/247,027, filed on Oct. 11, 2005, now Pat. No. 7,349,891, which is a division of application No. 10/234,065, filed on Sep. 3, 2002, now Pat. No. 6,980,978.

(30) Foreign Application Priority Data

Sep. 7, 2001  (EP) ..................................... 01480082

(51) Int. Cl.
*G06F 15/177* (2006.01)
*G06F 15/173* (2006.01)
*G06F 3/00* (2006.01)

(52) U.S. Cl.
USPC ............ 709/223; 709/220; 709/224; 719/318

(58) Field of Classification Search
USPC ................ 709/220, 223, 224; 707/1, 10, 100
See application file for complete search history.

(56) References Cited

U.S. PATENT DOCUMENTS

| | | | |
|---|---|---|---|
| 6,006,231 A | 12/1999 | Popa | |
| 6,370,573 B1 * | 4/2002 | Bowman-Amuah | 709/223 |
| 6,487,457 B1 * | 11/2002 | Hull et al. | 700/17 |
| 6,980,978 B2 | 12/2005 | Charron et al. | |
| 2002/0007463 A1 * | 1/2002 | Fung | 713/320 |
| 2002/0080575 A1 * | 6/2002 | Nam et al. | 361/686 |
| 2003/0023874 A1 | 1/2003 | Prokupets et al. | |

* cited by examiner

*Primary Examiner* — Ranodhi Serrao
*Assistant Examiner* — Farrukh Hussain
(74) *Attorney, Agent, or Firm* — Schmeiser, Olsen & Watts, LLP; Mark C. Vallone

(57) ABSTRACT

A method for managing an event by a Management system for an Internet Data Center (IDC). The IDC includes an Information Technology and Network Management System (IT&N) for managing the IDC, and a Building Management System (BMS) for monitoring facilities related to the IDC. The BMS is connected to the IT&N. An occurrence of the event is detected. The IT&N launches a first program that activates variables defining a critical situation impacted by the event. The IT&N starts a second program associated with requirements of a Service Level Agreement (SLA) with respect to the activated variables. The second program chooses actions dictated by the requirements of the SLA with respect to the activated variables. The actions are performed by executing internal commands within the IT&N or by the BMS performing the actions after the BMS has received an identification of the actions from the IT&N.

18 Claims, 2 Drawing Sheets

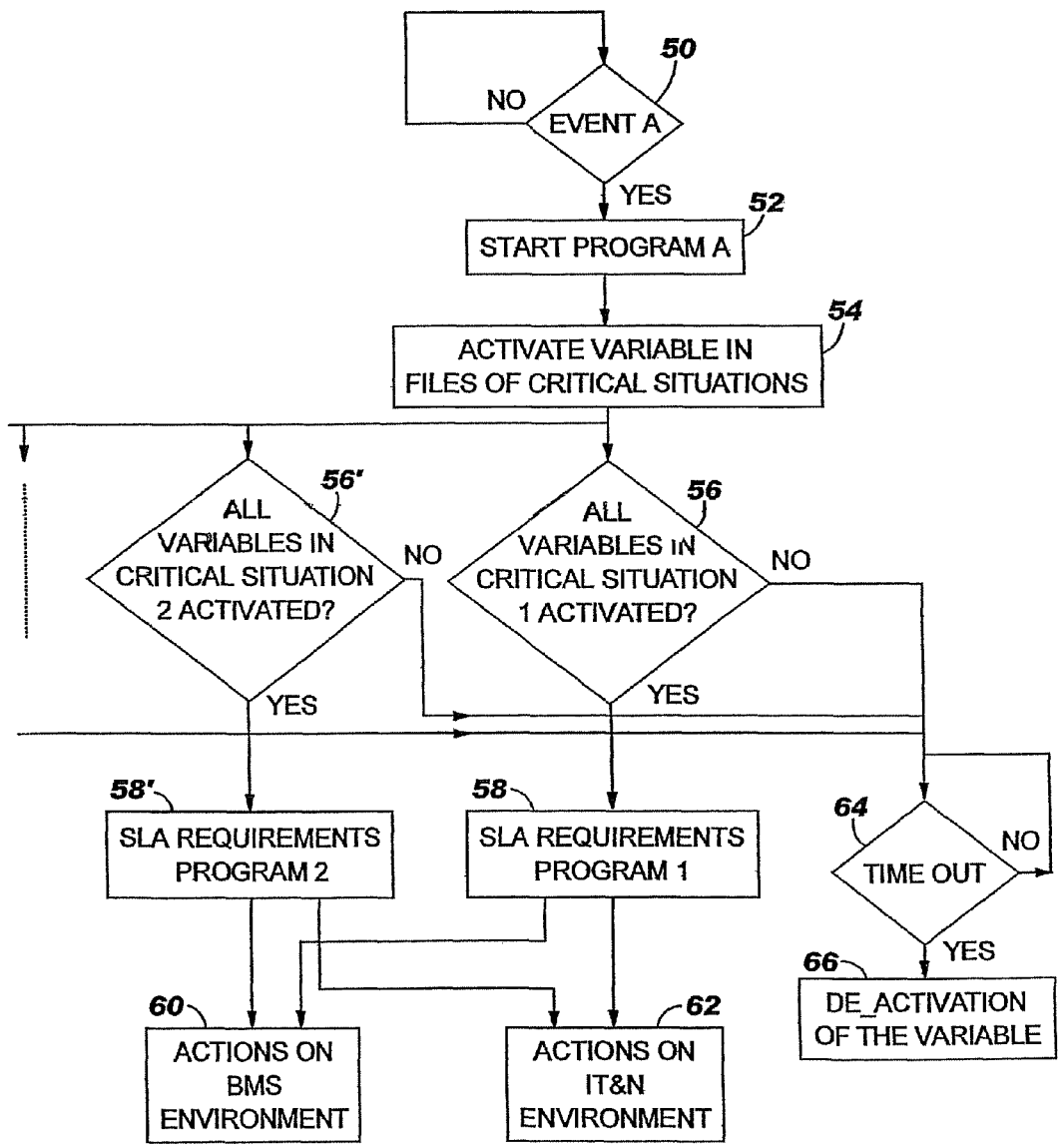

SITE INTEGRATION MANAGEMENT SYSTEM FOR OPERATIONAL SUPPORT SERVICE IN AN INTERNET DATA CENTER

This application is a continuation application claiming priority to Ser. No. 11/247,027, filed Oct. 11, 2005, which is a divisional of Ser. No. 10/234,065, U.S. Pat. No. 6,980,978.

FIELD OF THE INVENTION

The present invention relates to Internet Data Centers (IDC) which offer to customers a combination of solid and secure high speed networking and data center services including servers, storage and network transport, and relates in particular to a management system for an Internet Data Center.

BACKGROUND

The management of an Internet Data Center (IDC) is generally achieved by several entities being functionally and physically different and having no relationship between them: an Information Technology and Networking Management System (IT&N), a Building Management System (BMS) and a Facility Management System (FMS).

The BMS monitors all systems related to the site such as access control, fire protection, and intruder protection. Specific drivers can integrate specific equipment such as Uninterruptible Power Systems (UPS), chillers or other equipment that is part of the IDC Site installation. A BMS is a structured, organized and integrated system that easily supervises the entire IDC site infrastructure and thus provides a unified management. It integrates and manages all the Site related available data and verifies that their values are in predefined ranges. It may launch corrective actions and may provide emergency services in case of detected problems. The user can easily participate in the decisions by accessing a collection of documents related to all site system malfunctions such as geographical location, alarm lists and texts, and graphical value views of each detector.

The FMS supervises all needs related to the Site asset management and facility descriptions. It maintains up to date all geographical views and information about equipment (IT and non IT), furniture and building space. With an FMS, an organization may use one source for all its facility information needs. The FMS allows the manipulation of drawings, reports, requests and different layer views with intuitive navigation to any device in any of the drawings and display of detailed information about that object. Moreover, FMS is provided with maintenance and inventory functions.

The IT&N is used to administer small and large IT infrastructures. This entity has evolved with more specific modules highly targeting the Internet Data Center management requirements. It is divided into two parts. The first part is the OSS (Operational Support Service), and the second part is related to resources such as asset management, network, material, and applications. This implementation is sometimes called IS (Integrated Solutions) because it is a structured, organized and integrated system that easily supervises the entire IDC infrastructure and thus provides a unified IT system management.

The central point of IT&N is constituted by the Operational Support Services (OSS) which are key services for a successful implementation of an IDC. It is this system that gives the personality and the efficiency to the Internet Data Center, serving as the glue between all the management components. It allows a service-oriented business implementation of the IDC management platform and creates a competitive advantage by managing the Service Delivery through an integrated, management solution. It is today critical to offer very high availability to a mission-critical infrastructure such as an IDC. Service Level Agreements (SLAs) are becoming key commitments required in a customer's contract, with guaranteed compensation if specified levels of availability, speed and bandwidth are not met.

An OSS is often built today using IT and Networking management platforms such as "TIVOLI" (IBM trademark) or "Computer Associate". In order to integrate the Site management requirements into the OSS, several functions are generally added. Site management applications such as GPAX (IBM trademark) and Aperture (Aperture trademark) which are capable of communicating with other applications, can be the right addition to the OSS platform. Each application brings new added value, defines skills and create an effective global management platform where all the dependencies can be covered (Site infrastructure, IT infrastructure and Networking).

The set of applications selected fulfill the groupware concept for an OSS. However, none comply with the previous integration criteria to create a single groupware environment for an improved OSS platform. Full scalability and easy adaptation to one or several sites requires specific capabilities that many site management applications do not have. Some look simple for small configurations but become very complex in large-scale environments. Others are highly capable of supporting a defined set of requirements but are very poor regarding data communication to support the groupware environment. For an IDC, the data transfer, data storage and data processing must be highly secured and efficient.

Japanese patent JP 07023479 entitled "Building Automation System" (BAS) discloses a method that could be nearly a BMS. It relates to an institution management apparatus for multistory building which converts a point address contained in alarm information into a symbol expressing apparatus, area and floor classification. In large installations, all HVAC components (sensors, counters, contacts, etc.) are connected via a DDC/PMS (Direct Digital Control/Programmable Management System) unit to a BAS and the BAS is connected to the BMS. This patent considers management of only the HVAC components (for example air conditioning, or power supply equipment). In fact, many BMS manage several subsystems like HVAC but also access control, intruder alarm system, and fire alarm systems. A powerful user interface is provided, which gives access to schematics and symbols. The schematics are graphical views (e.g. ground plan of a floor, or the block circuit diagram of an air-conditioning system) or displays of field points which are updated dynamically. The field point definition determines the position of the detector in the schematic, and which appearance and information it has to have. A field point can be defined as an active button; clicking on the button brings up an emergency list, for example, or may be area and floor classification.

U.S. Pat. No. 4,526,068 discloses a method to collect information about various parameters such as humidity, and temperature. These environmental parameters are measured with a portable device and registered together with information giving the time and location of each measurement. The readings are interrelated parameters, e.g. temperature and relative humidity. They can be subjected to corrections such as linearization. A keyboard on the device enables the instantaneous read-out of a selected parameter on a common display panel, or the detection of dangerous concentrations of noxious gasses may set off an alarm.

This US patent as well as the above Japanese patent relate only to one part of the overall fulfilling requirements for the complete groupware solution. Indeed, since each part of the IDC operation is run by a different organization with specific roles and competencies, there is no structured relationship between the various management systems. The Site FMS has little or even no groupware action on the IT&N. The interrelations that allow committing and managing the Service Level Agreement (SLA) are not captured by the FMS, and the BMS thus creates major operation risks and increases the cost of establishing the right availability of the IDC. This issue is also true between the BMS and the IT&N in regard to the alarms in various fields of the facility and the impact into the IT operation. This kind of situation reduces interoperability and creates operational deficiencies, communication difficulties and delay problems.

SUMMARY OF THE INVENTION

Accordingly, an object of the invention is to provide a management system enabling the automation of a fully managed and autonomous Internet Data Center (IDC), reducing operational cost and optimizing decisions and performances in regard to the business engagement for the IDC customers and the related Service Level Agreements (SLA).

Another object of the invention is to provide a management system for an Internet Data Center (IDC) providing a scalable, highly available, fully automated environment for the Operational Support Service (OSS), integrating the Facility Management System (FMS) and the Building Management System (BMS) with minimum operator interface and low human intervention.

The invention relates therefore to a management system of an Internet Data Center (IDC) comprising an Information Technology and Network Management System IT&N for managing the Internet Data Center, a Building Management System BMS for monitoring all facilities related to the IDC such as access control, fire protection and intruder protection, and a Facility Management System FMS for maintaining up to date geographical views and information about equipment, furniture and building space of the IDC. The BMS is connected to the IT&N for transmitting thereto event data each time an event occurs, such an occurrence being achieved when one or several parameters associated with the event are out of a predetermined range of values. The IT&N comprises Operational Support Service OSS for processing the event data, defining actions resulting from the processing and transmitting commands to the BMS and/or to the IT&N in response to the defined actions.

BRIEF DESCRIPTION OF THE DRAWINGS

The above and other objects, features and advantages of the invention will be better understood by reading the following more particular description of the invention in conjunction with the accompanying drawings wherein:

FIG. 1 is a block diagram of an Internet Data Center Management system according to the invention comprising an Information Technology and Network Management System (IT&N), a Building Management System (BMS) and a Facility Management System (FMS) and the links there between.

FIG. 2 is a flow chart illustrating the steps of the method used in the invention to process the event data from the BMS in the Operational Support Services of the IT&N.

DETAILED DESCRIPTION

Figure 1:
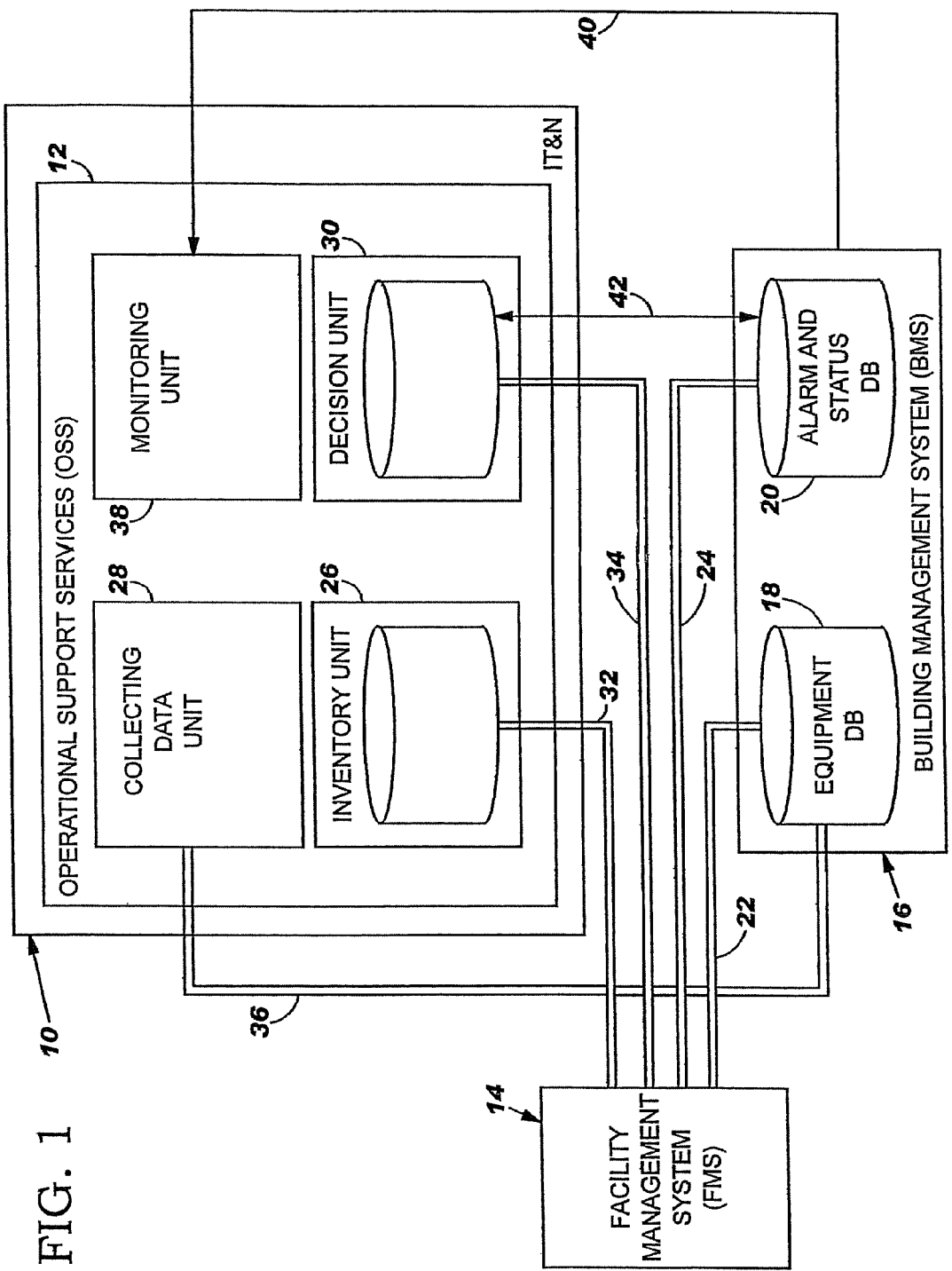

According to the invention, the management system for the Internet Data Center (IDC) illustrated in FIG. 1 includes an Information Technology and Networking Management System (IT&N) 10 for managing the IDC, the main part of which being the Operational Support Services (OSS) 12, a Facility Management System (FMS) 14 for maintaining up to date geographical views and information about equipment, furniture and building space of the IDC, and a Building Management System (BMS) 16 for monitoring facilities related to the IDC such as access control, fire protection and intruder protection.

The FMS 14 is a visual tool providing several independent functions which can be represented by various modules (not shown) such as the following:

A Furniture Management module which tracks furniture inventories, both existing and warehouse. It also provides for space planning and reconfigurations with automatic reporting of new requirements vs. existing inventories. It enables determination of which items can be used from existing and warehouse inventories and what additional items need to be purchased or what excess inventory needs to be warehoused.

An Equipment Management module, which tracks equipment inventories, financial information on leased vs. owned equipment, service contracts, warranties, and equipment capabilities.

A "Request system by Intranet" module provides facilities and IT managers with an automated way to receive, route, delegate, and manage employee service, equipment, new hire, and move requests over an Intranet. It is a web-based work request and work flow management system. It is based on an e-commerce model and is customizable to fit an organization's particular needs. Ultimately, it helps to relieve the problems that facilities managers, IT managers, and their customers meet when making or managing requests.

A Space Management module, which measures easily and accurately the building, floor, tenant, department, and/or assigned office space. These measurements are used to charge occupants for space costs and/or analyze space use efficiencies using a variety of methods. The Space Management function allows for measurement of each floor's gross, core, building common, floor common, department space, circulation, and assigned space, and then apportions the space to each department, division, and so forth.

In general, the FMS provides four kinds of functionality: "Drawings", "Stylizer", "Show" and "Find" functions.

"Drawings" is a repository of drawings obtained by Auto CAD document imports or using FMS drawing tools, and may include:

Drawings related to each IDC (eventually if several tenant sites).

Drawings related to the building(s): boundaries, and so forth.

Drawings related to space management (if there isn't a related database): space vacancy, cost space.

"Show" is a layer representation. The selected elements appear on the foreground, such as:

Furniture visualization

Equipment (Networking system and BMS) visualization

BMS alarm visualization

Networking system alarm visualization.

"Styliser" associates colors to different elements, depending on a criterion. For example, if the criterion is the date, it may visualize the more recent interventions in a different color. For example:

Maintenance

Space visualizations (if there isn't a related database) vacancy.

"Find" provides a very interesting functionality: to locate an employee. A reference table associates a name with a location. For an employee name, it returns an associated location in the building. This request system can be used to support the following:

BMS alert requests

Networking system alerts requests

BMS equipment requests

Networking system equipment requests.

The BMS 16 comprises an equipment database 18 containing the data relating to the IDC equipment and an alarm and status database 20 containing the data relative to IDC detectors which are responsive to set alarms. All the data contained in this database can be visualized in the BMS. By this way the parameters of each detector are customizable. Each information point (IP) represents the address of a connected device such as a smoke detector of a fire alarm system, a glass break sensor of an intruder alarm system, or information from facilities that are part of the HVAC installation in a building such as heat meters or flow meters. The IP definition determines how the message of the facility system should be interpreted, e.g. conversion of the raw value in impulse number into the actual unit of measurement in m3 of gas.

The data contained in the equipment database 18 and in the alarm and status database 20 are transmitted for visualization to the FMS 14 respectively by data link 22 and data link 24.

Different data links could be used in the implementation such as the synchronous link ODBC (standing for Open Data-Base Connectivity), which is a Microsoft strategic interface for accessing data in a heterogeneous environment of relational and non-relational database management systems or an asynchronous link, e.g. MQ series.

The data link 22 between database 18 and, the FMS 14 collects information related to the BMS equipment. For this, the information relating to the IP window mentioned above can be used since it provides the address and the name of each detector. The data link 24 between database 20 and the FMS 14 collects information relating to the BMS alarms. For this, the information related to the IP alarm list can be used. Note that only alarms with state=ACTIVE and status=ALARM should be selected.

The OSS 12 of IT&N 10 includes several independent modules which are important to the invention. The modules are:

Inventory unit 26 which offers enterprise class inventory management. This unit automatically scans for and collects hardware and software configuration information from computer systems in the customer's enterprise. At the same time, it is a powerful tool for empowering help desk support technicians, and can significantly reduce the costs of customer asset management efforts.

Collecting data unit 28 is a tool for transforming raw data into information. This information is presented in a variety of graphical formats that can be viewed interactively (slice, dice, drill down, or drill through for example). Using this unit, graphical views of predefined data can be obtained.

Decision unit 30 manages the information system from a wide variety of sources in a client/server environment. This unit handles information (events) according to priorities previously determined, correlates events from one source with those from another source, applies decisions about those events through the use of rules, takes corrective actions, and informs the right people when required. It provides a centralized location for managing events. It validates incoming events. When the database entry for an event is created or modified, the event is analyzed to see if any existing rules apply to the event.

The inventory unit 26 includes an equipment database and the decision unit 30 includes an alarm and status database with the same functions as databases of BMS. These databases are linked by respectively an ODBC link 32 and an ODBC link 34 to FMS 14.

The Collecting Unit 28 provides a panel used to display graphical views of the BMS equipment thanks to an ODBC link 36 from the BMS equipment database 18. Different values related to BMS parameters are monitored. By this way, it is possible to correlate different information and to analyze causes and consequences of environment trends.

First, the collecting unit chooses the representative BMS detectors. For each room of the IDC, one detector of each system of interest is selected. Thus, each room corresponds to a set of BMS detectors reporting a set of values. Then, the values representing the behavior of the systems and the environment states are visualized. The user interface of the collecting unit 28 is in general divided into three parts: a Topic Map pane which is customized by defining the BMS parameters being chosen, a View pane for displaying the graphics representing the parameters such as temperature, humidity, and a Helper pane for displaying messages.

Another feature of the invention is a data link 42 between the alarm and status database 20 of the BMS 16 and the decision unit 30 of the IT&N 10. Because BMS information may not always be understandable by the Decision Unit, it may be necessary to convert this information into IT&N information by using an adapter such a program having both functions of converting and filtering. The function of filtering permits transmission to the OSS of only the needed information insofar as only a part of status and alarm information is ordinarily interesting. Furthermore, it is important that OSS 12 may regularly visualize the critical parameters of the BMS 16 related to the IT&N environment servers. Such a function is achieved by a monitoring unit 38 in the OSS 12 which monitors the BMS 16 via a line 40, whereas the information about BMS events is exchanged between database 20 (alarms and status) and decision unit 30 by means of the already mentioned TCP/IP link 42. Note that the event data being exchanged may be either a predefined set of information or data corresponding to one or several parameters associated with the event which are out of a predetermined range of values (it is often the case when a predetermined threshold has been reached).

The processing of the BMS events by the decision unit 30 is achieved according to the flow chart illustrated in FIG. 2. The event being classified in several categories, the first step is to recognize whether an event of the category A occurs (step 50). If so, a program A is launched by an event server located in decision unit 30 (step 52). Note that the event server recognizes each category of events and associates a rule to be applied. Such a rule is of the type "what to do when this event is received".

When a rule is applied because an event A has occurred, the first action of the event server is to activate a variable in several files of critical situations wherein the event (defined by this variable) is taken into account (step 54). The files of critical situations implied by the event A contain all the parameters defining this situation. The action of activating a variable may include incrementing a counter.

The second action of the event server is to verify whether the variables listed in any one of N critical situations 1, 2 ... N being affected by event A are activated (step 56, 56' ... ). If, for a given critical situation, all the variables are being activated, another program is started (step 58, 58' ... ), such a program being associated with the requirements of the related Service Level Agreement (SLA). Then, the SLA requirements program chooses a set of actions using libraries, such actions being either on BMS environment (step 60) and included in files transmitted to the BMS, or on IT&N environment (step 62) performed by internal commands. When a variable is activated, a time out counter may start to increment. When all variables are not activated for a critical situation within the predefined "Time out" (step 64), it is considered that the variable is off and may be deactivated (step 66).

Examples

1. Uninterruptable Power Supply Failure

UPS are by definition managed by the BMS 16. If a problem is detected that could impact the server or network infrastructure, the IT&N 10 acts in order to choose an optimized solution related to the SLA or business environment at this given time.

Without the integrated architecture, when a UPS is failing, the failing UPS status and reports are provided to the BMS 16 and sometimes to the IT&N 10. Actions are launched by the facility manager to repair the UPS problem. Finally some decisions are taken by the IT manager to stop some servers.

With the integrated architecture according to the invention, the BMS 16 collects UPS status and reports an environmental capability to the IT&N 10 which analyses the required historical data related to such a situation including the immediate SLA requirements and predictive element lists to build a decision. The IT&N 10 transfers to BMS 16 the elements of the decision. The BMS 16 transfers to all the impacted environmental systems the new configuration to face the situation. For example, the BMS 16 receives an alarm concerning a UPS failure: "the back up lead time is low". If nothing is done quickly, servers attached to this UPS are at risk. Based on the decision set up by the IT&N 10 for this failure, selected servers are shut down while others are reconnected by the BMS 16 to other UPS. The analysis of the problem (depending on criteria) establishes the urgency level that the IDC organization must act on to resolve this failure. Back up functions can be decided by the organization to recover a defined availability level.

2. IDC Maintenance Program

The FMS 14 launches work sheets concerning maintenance programs. Several schedules are proposed in order to supervise preventive and corrective actions on the equipment. Without the integrated architecture, those schedules are built on the maintenance timetable provided by each equipment supplier.

With the integrated architecture according to the invention, the IT&N 10 and the FMS 14 are connected to establish a general IDC maintenance program taking into account the SLA requirements and the IT infrastructure changes. SLA requirements are used to plan maintenance windows out of the critical periods corresponding to the high availability needs. It is thus possible to define at the same time an efficient workforce planning and an on time supply of the maintenance parts to minimize the total cost of ownership.

In conclusion, the system according to the invention described here above provides architecture rules for a complete OSS based on a scalable platform that allows important savings in time, money and energy. This platform creates a single system and thus is the grouping of human and computing resources into the organization structure of the IDC. Actions and decisions can be made more effectively and more rapidly by providing exchanges between the applications and therefore, reporting the right information only to the right set of persons managing the IDC, with a minimum set of control and decision mechanisms.

Furthermore, the system according to the invention allows treating the main operations at a global level while having dedicated people and organization in charge of defined roles. Such Groupware can correlate and visualize the interactions and influences between each decision and the global business objective of the IDC. The decisions taken and actions done will be the best ones for the total IDC delivery objective with little or no impact on the IDC business objective. Decision tools can be structured to automate many of the decisions while sending to the NOC the few crucial cases that require human intervention.

We claim:

1. A method for managing an event by a Management system for an Internet Data Center (IDC), said IDC comprising an Information Technology and Network Management System (IT&N) for managing said IDC, said IDC further comprising a Building Management System (BMS) for monitoring facilities related to said IDC, said BMS being connected to the IT&N, said method comprising:
   detecting an occurrence of the event;
   after said detecting, said IT&N launching a first program;
   after said launching the first program, said first program activating variables defining a critical situation impacted by the event;
   after said activating variables, said IT&N starting a second program associated with requirements of a Service Level Agreement (SLA) with respect to the activated variables;
   after said starting the second program, said second program choosing actions dictated by the requirements of the SLA with respect to the activated variables;
   after said choosing actions, performing said actions by executing internal commands within the IT&N or by said BMS performing said actions after the BMS has received an identification of said actions from the IT&N.

2. The method of claim 1, wherein said performing said actions are implemented by executing internal commands within the IT&N.

3. The method of claim 1, wherein said actions are implemented by said BMS performing said actions, and wherein the method further comprises:
   prior to said BMS performing said actions, said IT&N transmitting an identification of said actions to the BMS; and
   said BMS receiving said identification of said actions transmitted by the IT&N.

4. The method of claim 3, wherein the event is a failure of an uninterruptible power supply (UPS), wherein the failure of the UPS impacts a server or network infrastructure, wherein the method further comprises said BMS managing the failure of the UPS, and wherein said BMS managing the failure of the UPS comprises said BMS performing said actions.

5. The method of claim 4, wherein said BMS managing the failure of the UPS comprises:

said BMS performing an analysis of historical data related to the critical situation in relation to the requirements of the SLA with respect to the activated variables;
said BMS reporting the analysis to the IT&N; and
said BMS receiving a decision from the IT&N, wherein the decision includes said identification of said actions,
wherein the method further comprises prior to said BMS receiving the decision, said IT&N utilizing the analysis received from the BMS to make the decision and said IT&N transmitting the decision to the BMS.

6. The method of claim 5, wherein said BMS performing said actions comprises said BMS transferring, to environmental systems impacted by the critical situation, a new configuration for use in to dealing with the critical situation.

7. The method of claim 6, wherein the new configuration is a configuration in which selected servers are shut down while other servers are reconnected by the BMS to other uninterruptible power supplies.

8. The method of claim 5, wherein the method further comprises establishing an urgency level with respect to the failure of the UPS, said urgency level based on the analysis.

9. The method of claim 3, wherein the IT&N comprises an Operational Support Service (OSS), and wherein the method comprises:
said OSS processing event data pertaining to the event in accordance with predetermined priorities, wherein the event data are from multiple sources; and
said OSS correlating event data from one source of the multiple sources with event data from another source of the multiple sources.

10. The method of claim 9, wherein the BMS includes an alarm and status database which stores the event data and which stores data relative to IDC detectors which are responsive to set alarms, wherein the alarm and status database of the BMS is linked to the OSS by a TCP/IP link for communicating the event data between the OSS and the alarm and status database of the BMS, wherein the method further comprises said BMS visualizing selected data stored in the alarm and status database of the BMS through use of visualization means comprised by the BMS, and wherein the selected data comprises the event data and/or the data relative to IDC detectors.

11. The method of claim 10, wherein a decision unit of the OSS includes an alarm and status database whose function are the identical to the functions of the alarm and status database of the BMS.

12. The method of claim 9, wherein the OSS includes a monitoring unit linked to the BMS, and wherein the method further comprises said monitoring unit visualizing BMS parameters related to IT&N environment servers.

13. The method of claim 9, wherein the BMS comprises an equipment database, wherein the equipment database of the BMS comprises BMS equipment representations of BMS equipment comprised by the BMS, and wherein the method further comprises displaying graphical views of the BMS equipment from the BMS equipment representations in the equipment database of the BMS.

14. The method of claim 13, wherein an inventory unit of the OSS includes an equipment database whose function are the identical to the functions of the equipment database of the BMS.

15. The method of claim 9, wherein the OSS includes an inventory unit, and wherein the method further comprises said inventory unit collecting hardware and software configuration information from computer systems in a customer's enterprise.

16. The method of claim 1, wherein the IDC further comprises a Facility Management System (FMS) for maintaining up to date geographical views and information about equipment, furniture and building space of said IDC, wherein the FMS includes a furniture management module, an equipment management module, a request system by Intranet module, and a space management module, and wherein the method further comprises:
said furniture management module tracking furniture inventories;
said equipment management module tracking equipment inventories;
said request system by Intranet module providing facilities to receive, route, delegate and manage employee service, equipment, new hire and move requests over an Intranet; and
said space management module measuring assigned office space.

17. The method of claim 16, wherein the method further comprises said FMS launching work sheets concerning a maintenance program.

18. The method of claim 17, wherein the maintenance program takes into account the requirements of the SLA, and wherein the method further comprises said FMS using the requirements of the SLA to plan maintenance windows out of critical periods corresponding to high availability needs.

* * * * *